United States Patent [19]

Sakanaka et al.

[11] 4,367,097

[45] Jan. 4, 1983

[54] METHOD FOR MANUFACTURING GRANULAR ORGANIC RUBBER CHEMICAL COMPOSITION

[75] Inventors: Yasuhiro Sakanaka, Shinnanyo; Takao Hayashi, Hikari; Tatsuya Koizumi; Sumio Akashi, both of Yamaguchi, all of Japan

[73] Assignee: Toyo Soda Manufacturing Co., Ltd., Shinnanyo, Japan

[21] Appl. No.: 294,799

[22] Filed: Aug. 20, 1981

[30] Foreign Application Priority Data

Aug. 21, 1980 [JP] Japan ................................. 55-115157

[51] Int. Cl.$^3$ ................................................. C09K 3/00
[52] U.S. Cl. ..................................... 106/901; 528/486; 528/487
[58] Field of Search ................ 106/901; 528/486, 487, 528/376; 525/349

[56] References Cited

U.S. PATENT DOCUMENTS 2,933,464  4/1960  Gibbs ..................................... 525/349
4,031,302  6/1977  Shimizu et al. ....................... 528/486

FOREIGN PATENT DOCUMENTS 572453  3/1959  Canada ................................. 525/349

OTHER PUBLICATIONS

Offenlegungsschrift #25 57 562, Jun. 30, 1977.

*Primary Examiner*—Theodore Morris
*Attorney, Agent, or Firm*—Armstrong, Nikaido, Marmelstein & Kubovcik

[57] ABSTRACT

This invention relates to a method for manufacturing a granular organic rubber composition which is useful for a vulcanizing agent, a vulcanization accelerator and antioxidant etc. by contacting an organic rubber chemical mixture comprising a rubber chemical, a liquid polybutene, a nonionic or anionic surface active agent and a water-soluble anionic macromolecule with an aqueous solution containing an alkaline earth metal salt and/or a zinc salt.

6 Claims, No Drawings

METHOD FOR MANUFACTURING GRANULAR ORGANIC RUBBER CHEMICAL COMPOSITION

DETAILED DESCRIPTION OF THE INVENTION

This invention relates to a method for manufacturing a granular organic rubber chemical composition and more particularly to a method for the manufacture of a granular organic rubber composition in which an organic chemical mixture consisting of an organic rubber chemical such as a vulcanizing agent, a vulcanization accelerator an antioxidant, etc.; wherein a liquid polybutene, a nonionic or anionic surface active agent, a water-soluble anionic macromolecule containing a carboxyl group or a hydroxyl group within the molecule thereof and, if necessary, process oil, an ethylene-vinyl acetate copolymer (hereinafter will be called EVA for short), paraffin wax or a plasticizer is hardened by bringing the mixture into contact with an aqueous solution containing an alkaline earth metal salt or a zinc salt.

Generally, most of the organic rubber chemicals such as a vulcanizing agent, a vulcanization accelerator, an antioxidant, etc. are in a powdery state measuring less than 300μ. Therefore, in handling them when the rubber is processed by means of roll milling machine or a Bumbury mixer, the powder of them tends to spatter and thus tends to enter the inside of the human body through nostrils, etc. Meanwhile, the advancement of the rubber industry in recent years has prompted the rationalization of working processes in the various fields of the industry. In the field of the above stated organic rubber chemicals, the use of a granulated or flaked products has become preferable for the purpose of preventing the spattering of these chemicals, for improvement in the working conditions, etc. To meet this tendency, various kinds of granulated organic rubber chemicals have come to be supplied to the rubber industry. However, with regard to such granulated organic rubber chemicals, there is a problem that they must have the same degree of dispersibility for rubber as the powdery organic rubber chemicals.

In an attempt to solve this problem, the present inventors strenuously conducted studies. As a result of these studies, they have come to invent a method for the manufacture of a granular organic rubber chemical composition measuring 1 to 5 mm in grain diameter. The composition has the same degree of dispersibility in rubber as the powdery chemicals and can be more easily handled than them.

In other words, it is an object of this invention to provide a method for manufacturing a granular organic rubber chemical composition wherein a mixture is prepared by mixing an organic rubber chemical with, relative to this chemical, 5 to 45 wt % of a liquid polybutene which is of mean molecular weight of 200 to 10,000 and of viscosity not exceeding 37,000 centi-stokes at 100° F., 0.1 to 20 wt % of a nonionic or anionic surface active agent and 0.1 to 8 wt % of a water-soluble anionic macromolecule which contains a carboxyl group or a hydroxyl group within the molecule thereof with 30 wt % or less than that of process oil, an ethylene-vinyl acetate copolymer, paraffin wax or a plasticizer further added as desired; and then the mixture thus obtained is hardened by bringing it into contact with an aqueous solution containing at least one kind of matter selected out of alkaline earth metal salts and zinc salts.

In accordance with the manufacturing method of the invention, a reaction product obtained through the reaction between the anionic water-soluble macromolecule and the alkaline earth metal salt or the zinc salt gives a granular matter homogeneously containing the organic rubber chemical therein.

Since the organic rubber chemicals are to be used as main constituents in the present invention, the granular composition must contain a certain amount of the chemical therein. Normally, however, an amount of the organic rubber chemical contained in the granular composition exceeding 50 wt % suffices.

The organic rubber chemicals to be used in accordance with the present invention include a vulcanizing agent, a vulcanization accelerator and antioxidant, etc. that are employed as rubber chemicals in general. For example, the vulcanizing agent may be selected from the group consisting of an oxime such as p-quinone dioxime, p,p'-dibenzoyl quinone dioxime, etc. and disulfide such as morpholine disulfide, etc. The antioxidant may be selected from the group consisting of an alkyl phenol such as 2,6-ditertiary-butyl-p-cresol,4,4'-thiobis (6-tertiary-butyl-3-methyl phenol), etc.; an aromatic amine such as phenyl-$\beta$-naphthyl amine, N,N'-di-2-naphthyl-p-phenylene diamine, etc.; a benzo-imidazole such as 2-mercapto-benzo-imidazole, 2-mercapto-benzo-imidazole zinc salt, etc.; and a xanthate such as isopropyl-xanthate nickel salt, etc.

The vulcanization accelerator may be selected from the group consisting of a guanidine type vulcanization accelerator such as guanidine, diortho-tolyl guanidine, etc,; a thiazole type vulcanization accelerator such as 2-mercapto-benzo-thiazole, dibenzo-thiazyl sulfide, N-cyclo-hexyl-2-benzo-thiazole-sulfenic amide, N-oxy-diethylene-2-benzo-thiazole-sulfenic amide, etc.; a thiourea type vulcanization accelerator such as 2-mercapto-imidazoline, diethyl thiourea, trimethyl thiourea, etc.; a thiuram type vulcanization accelerator such as tetramethyl thiuram monosulfide, tetramethyl thiuram disulfide, tetraethyl thiuram disulfide, tetrabutyl thiuram disulfide, etc.; a dithio-carbamate type vulcanization accelerator such as dimethyl dithio zinc carbamate, diethyl dithio zinc carbamate, di-n-butyl dithio zinc carbamate, etc.; and a xanthate type vulcanization accelerator such as isopropyl zinc xanthate.

In some case, these organic rubber chemicals are water soluble. In practising the present invention, however, the loss of the water-soluble chemicals can be effectively prevented by the carrying out granulation using a saturated solution of the organic rubber chemical beforehand or by carrying out granulation at a low temperature or by some other suitable method for obtaining a granular product at a high rate of yield.

The liquid polybutene to be used in accordance with the invention may be selected from commercially available products which are manufactured from a butane-butene fraction produced by a generally known naphtha decomposition process. It is also possible to use the so-called hydrogenation polybutene or the like. The liquid polybutene to be used in carrying out the invented method is of average molecular weight of 200 to 10,000, preferably 250 to 20,000 and is of viscosity not exceeding 37,000 (at 100° F.), preferably not exceeding 5,000 and more preferably less than 1,000 in centi-stokes as defined by JIS K 2283.

The addition of the liquid polybutene not only permits adjustment of the hardness of the granular composition to be obtained to a suitable value but also prevents the organic rubber chemicals from spattering and effectively increases the dispersibility of the chemicals. The addition quantity of the liquid polybutene based on the quantity of the organic rubber chemical is 5 to 45 wt % and preferably 10 to 40 wt %. If the addition quantity is less than this range of quantity, it would be impossible to attain a sufficient effect for prevention of spattering of the organic rubber chemical and for the dispersibility thereof. Conversely addition of the liquid polybutene in excessive quantity is not desirable because it would degrade the properties of the granular composition.

Further, as for the surface active agent to be used in accordance with the invention, an anionic or nonionic surface active agent is usable. The surface active agent may be selected from the group consisting of anionic surface active agents such as fatty acid soap, sodium alkyl sulfate, sodium lauryl alcohol sulfate, sodium polyoxy ethylene alkyl-ether sulfate, alkyl sufonate, sodium naphthalene sulfonate-formaldehyde condensate, alkyl phosphate; and a nonionic surface active agent such as polyoxy ethylene lauryl ether, polyoxy ethylene stearyl ether, polyoxy ethylene oleyl ether, polyoxy ethylene nonyl phenol ether, plyoxy ethylen octyl phenol ether, polyethylene glycol mono-laurate, polyethylene glycol mono-stearate, etc. Each of these surface active agent is used in quantity within the range from 0.1 to 20 wt % based on the quantity of the organic rubber chemical and preferably within the range from 0.5 to 15 wt %. The use of the surface active agent in quantity less than the above stated range would result in an insufficient effect for prevention of spattering of the organic rubber chemical and for the dispersibility thereof. Conversely the use of it in excessive quantity is also not desirable as it would result in insufficient hardness of the granular composition.

The addition of the liquid polybutene and the surface active agent in accordance with the invention serves to improve the properties such as hardness, etc. of the granular composition and, when the granular composition is actually added to rubber, the spattering, dispersibility and adhesiveness to rolls, etc. can be improved as mentioned in the foregoing. However, if necessary, the dispersibility of the granular composition within the rubber can be further improve by adding a plasticizer such as process oil, EVA, paraffin wax, fatty acid ester, etc.

The process oil may be selected from the group consisting of naphthene type oil, aromatic type oil, paraffin type oil, etc. that are generally added in processing rubber. The EVA usable in accordance with the invention is of a melt index 1.5 to 350 and contains vinyl acetate in quantity 6 to 40%. Further, the paraffin wax usable in accordance with the invention is a white, semitransparent, waxy, crystalline paraffin wax obtained by separation from petroleum and through a refining process. For example, a commercially available product having the melting point thereof between 47° and 68° C. is usable.

These additives are used in quantity not exceeding 30 wt % against the organic rubber chemicals. Addition of these additives in quantity greater than that is not desirable in terms of properties.

The water-soluble anionic macromolecule which has a carboxyl or hydroxyl group within the molecule thereof and is usable in accordance with the present invention may be selected from the group consisting of konjak mannan, agar, carrageenan, sodium alginate, carboxy-methyl sodium cellulose, a copolymer of a vinyl monomer and acrylic acid or maleic anhydride. Of these matter, use of sodium alginate is preferable. The water soluble anionic macromolecule is used in quantity within the range from 0.1 to 8 wt % against the organic rubber chemical and preferably within the range from 0.5 to 6 wt %. Use of it in quantity less than 0.1 wt % causes insufficient hardening by the alkaline earth metal salt or zinc salt and thus results in insufficient granulation. On the other hand, use of it in quantity exceeding 8 wt % brings about adhesion of an excess of the water-soluble anionic macromolecule, which hinders granulation.

In preparing a mixture by dispersing the organic rubber chemical, the liquid polybutene, the surface active agent and the process oil, EVA, paraffin wax or a plasticizer which is further added if necessary in an aqueous solution of the water-soluble anionic macromolecule in carrying out the present invention, the degree of granulation to be accomplished by dropping the mixture can be adjusted without difficulty by testing the fluidity of the mixture through a preliminary experiment. To put it more specifically, in cases where the viscosity of the mixture is high and the mixture thus has insufficient fluidity for granulation, the fluidity thereof can be readily adjusted by diluting it with water. Further, in preparing the mixture, it is preferable to use an aqueous solution of a water-soluble anionic macromolecule in which the organic rubber chemical is uniformly dispersed for obtaining a granular matter homogeneously containing the organic rubber chemical. This can be accomplished without difficulty by using a high speed, high torque mixer such as a homogenizer, a homogenous mixer or the like. Where the organic rubber chemical is water-soluble, it may simply be mixed by means of a homogenizer or the like. However, it is preferable for better dispersion to have the organic rubber chemical dissolved under a heating condition and, after that, to have it kept under a low temperature condition preferably not exceeding 10° C. The water-soluble organic rubber chemical can be prevented from running off to water by such a method.

As to a process for granulation, the above stated mixture containing the organic rubber chemical may be granulated by dropping it into and allowing it to harden in an aqueous solution containing at least one kind of alkaline earth metal salts or zinc salts. It is also possible to granulate it by extrusion and by bringing the granular matter thus obtained into contact with the above stated aqueous solution of the metal salt to harden the granular matter. Thus, the granulating process can be carried out by an ordinary known method. The alkaline earth metal salt or the zinc salt may be selected, for example, from the group consisting of the chlorides of beryllium, magnesium, calcium, barium, strontium, zinc, etc.; metal salts of sulfate, etc.; and a mixture of such metal salts. However, it is preferable to use calcium chloride or zinc sulfate. The concentration of the aqueous solution containing the alkaline metal salt or the zinc salt is 1 to 10 wt % and preferably 2 to 6 wt %. If the concentration is less than 1 wt %, the hardening reaction would proceed too slow and the grains might be broken down under a stirring operation and the granular composition thus obtained also tends to be brittle. On the other hand, concentration exceeding 10 wt % is also not desirable, because grains float on the surface of the aqueous solution and thus tends to come to adhere to each other. Besides, the granular composition thus obtained is too hard and not readily breakable.

In such a case, if the organic rubber chemical is water soluble, the aqueous solution of the alkaline earth metal salt or the zinc salt should be kept under a low temperature condition and preferably kept at a temperature not exceeding 10° C. In this manner, a loss of the organic rubber chemical can be prevented to obtain a granular organic chemical composition at a high degree of yield.

The grain size of the organic rubber chemical composition to be obtained in accordance with the present invention can be controlled as desired. For that purpose, the viscosity of the aqueous solution of a mixture consisting of the organic rubber chemical, the liquid polybutene, the surface active agent and, if necessary, process oil, EVA, paraffin wax or a plasticizer and further the water-soluble anionic macromolecule is adjusted by varying the adding quantity or the kind of the water-soluble macromolecule or by diluting it with water or by adjusting the diameter of the dropping nozzle or the dropping rate or by selecting a suitable diameter for an extruding port.

The granular matter which uniformly contains the organic rubber chemical and is thus obtained through the process described in the foregoing is filtered and washed with water through known processes. Then, it is dried either under reduced pressure or under a gentle condition to obtain a granular organic rubber chemical composition measuring 1 to 5 mm in grain size.

Further, the hardness of the granular organic rubber chemical composition to be obtained by the method of the present invention is adjustable to a value suited to the purpose for which it is to be used. However, the hardness of the composition thus obtained is normally 10 to 600 g and preferably 50 to 400 g. The term "hardness" as used here means a load required for breaking the granular composition. The hardness is measured in the following manner: A suitable amount of a sample of a grain size between 1 to 5 mm is put on the upper tray of a balance. Then, with a spatula kept in parallel as much as possible with the upper tray, the pellets are gently pressed and a scale indication is read out when the breakup of the pellets are felt through the spatula. Hardness measurement is carried out in this manner on 20 pellets to obtain a mean value of the pellet hardness with the maximum and minimum values excluded.

Such being the present invention, the granular organic rubber chemical composition obtained by the invented method does not produce any dust of the organic rubber chemical to ensure safety. Besides, the composition can be satisfactorily used as organic rubber chemical because it can be handled without difficulty and on account of its good dispersibility. An experiment was conducted to examine the dispersibility of a granular organic rubber chemical composition obtained in accordance with the method of the present invention by carrying out milling. Observation with the unaided eye showed no insufficiently dispersed matter at all in a sheet like rubber product obtained through the experiment. It was thus ascertained that the organic rubber chemical composition was homogeneously dispersed in the same manner as in the case of ordinary organic rubber chemicals.

The following examples illustrate the method of this invention and are not to be construed to limit the scope of the invention. Unless otherwise stated, "parts" and "%" as used in these examples are by weight respectively.

EXAMPLE 1

Ten g of 2% sodium alginate, 6 g of a liquid polybutene (trade-mark: "Nisseki Polybutene LV-50" having average molecular weight of 470 and viscosity of 120 centi-stokes at 100° F.), 1.25 g of process oil, 0.125 g of a nonionic surface active agent known by a trade-mark "Emulgene 705" were mixed with stirring. Following this, 25 g of 2-mercapto-imidazoline powder which had been separately weighed out was added. Further, 20 ml of water was added. Then, mixing with stirring was further carried out to obtain a homogeneous mixture. The mixture thus obtained was allowed to naturally drop through a hole measuring 2 mm in diameter to have it hardened in a 2% aqueous solution of zinc sulfate. The mixture was thus granulated into a spherical shape. Upon completion of the dropping process, the granulated mixture was filtered, washed with water and dried to obtain 30 g of a granular matter measuring 3.5 mm in average grain size. The granular matter contained 69% of 2-mercapto-imidazoline. The hardness of the matter was 128 g.

EXAMPLE 2

Six g of 2% sodium alginate, 6 g of a liquid polybutene known by a trade-mark "Nisseiki Polybutene LV-25" having average molecular weight of 380 and viscosity of 65 centistokes, 1.5 g of process oil, 3 g of an anionic surface active agent known by a trade-mark "Hitenol N-08" and 16 g of 2- mercapto-imidazoline powder were mixed with stirring by means of a homogenizer. Cooling was effected down to 10° C. to obtain a homogeneous mixture. The mixture was allowed to naturally drop through a hole measuring 2 mm in diameter and was thus hardened in an aqueous solution of 2% calcium chloride to granulate it into a spherical shape. Upon completion of dropping, the mixture was filtered, washed with water and fried to obtain 23 g of a granular matter measuring 4.0 mm in average grain size. The granular matter thus obtained contained 72% of 2-mercapto-imidaline while the hardness thereof was 101 g.

EXAMPLE 3

Ten g of 2% sodium alginate, 10 g of a liquid polybutene known by a trade-mark "Nisseki Polybutene LV-50" and 0.125 g of nonionic surface active agent known by a trade-mark "Emulgene 705" were mixed with stirring. Following this, 25 g of dibenzo-thiazyl-disulfide powder which had been separately weighed out was added. Further, 20 ml of water was added with further stirring and mixing to obtain a homogenous mixture. Then, a granulating process were carried out in the same manner as in Example 1 to obtain 34 g of a granular matter measuring 3.5 mm in average grain size. The granular matter contained 64% of benzo-thiazyl-disulfide. The hardness of the granular matter was 325 g.

EXAMPLE 4

Ten g of 2% sodium alginate, 6 g of a liquid polybutene known by a trade-mark "Nisseki Polybutene LV-50", 1.25 g of process oil, 0.125 g of an anionic surface active agent known by a trade-mark "Demol NL" and 1 g of fatty acid ester were added together. They were heated up to 50° C. and then mixed with stirring. Following this, 25 g of 2-mercapto-imidazoline powder which had been separately weighed out was added. Then, 30 ml of water was further added with stirring and mixing further carried out to obtain a homogeneous mixture. After that, a granulating process was carried out in the same manner as in Example 1 to obtain 31 g of a granular matter measuring 3.2 mm in average grain size. This granular matter contained 70% of 2-mercapto-imidazoline which the hardness thereof was 222 g.

EXAMPLE 5

Three g of micro-paraffin wax of melting point 65° C. and 3 g of a liquid polybutene known by a trade-mark "Nisseki Polybutene LV-50" were dissolved and mixed at 70° C. To this mixture were added with stirring 10 g of 2% sodium alginate and 0.125 g of a nonionic surface active agent known by a trade-mark "Emulgene 705". After that, 25 g of 2-mercapto- imidazoline powder which had been separately weighed out was added. Then, 15 ml of water was also added with further stirring and mixing to obtain a homogeneous mixture. Following this, a granulating process was carried out in the same manner as in Example 1 to obtain 29 g of a granular matter measuring 3.5 mm in average grain size. The granular matter thus obtained contained 75% of 2-mercapto-imidazoline. The hardness of the matter was 333 g.

EXAMPLE 6

Three g of a liquid polybutene known by a trademark "Nisseki Polybuten HV-300" having average molecular weight of 1260 and viscosity of 32,000 centistokes at 100° F. was mixed with 2.5 g of process oil at 50° C. To the mixture thus obtained were added with stirring 10 g of 2% sodium alginate and 0.125 g of a nonionic surface active agent known by a trade-mark "Emulgene 705." After they had been mixed with stirring, 25 g of 2-mercapto-imidazoline powder and 20 ml of water were added with further stirring and mixing. A homogeneous mixture was obtained by this. A granulating process was then carried out in the same manner as in Example 1 to obtain 29 g of a granular matter measuring 3.5 mm in average grain size. This granular matter contained 74% of 2-mercapto-imidazoline. The hardness of the matter was 183 g.

EXAMPLE 7

One g of EVA known by a trade-mark "Ultrathene 630" having a melt index of 1.5 and containing 15% of vinyl acetate, 3 g of a liquid polybutene known by a trade-mark "Nisseki Polybuten LV-10" having average molecular weight of 310 and viscosity of 21 centi-stokes at 100° F. were added together. They were dissolved and mixed by heating up to 110° C. After completion of mixing, the mixture thus obtained was cooled down to 70° C. Following this, 10 g of 20% sodium alginate and 0.125 g of a nonionic surface active agent known by a trade-mark "Emulgene 705" were added with stirring and mixing. Then, 25 g of 2-mercapto-imidazoline powder and 31 ml of water added with further stirring to obtain a homogeneous mixture.

After that, a granulating process was carried out in the same manner as in Example 1 to obtain 27 g of a granular matter measuring 3.5 mm in average grain size. The 2-mercapto-imidazoline content of the granular matter thus obtained was 77% while the hardness thereof was 340 g.

EXAMPLE 8

Ten g of 2% sodium alginate, 4 g of a liquid polybutene known by a trade-mark "Nisseki Polybutene LV-50," 0.125 g of a nonionic surface active agent known by a trade-mark "Emulgene 705" were mixed with stirring. Then 25 g of dibenzo-thiazyl-disulfide powder was added with 10 ml of water further added and mixed with stirring to obtain a mixture. The mixture was granulated by extrusion. The extruded matter thus obtained was allowed to harden in a 2% zinc sulfate solution ($AnSO_4$). The hardened matter was filtered, washed with water and dried to obtain 27 g of a granular matter measuring 3.0 mm in average grain size. The dibenzo-thiazyl-disulfide content of this granular matter was 79% while the hardness thereof was 231 g.

EXAMPLE 9

Fifteen g of 2% sodium alginate, 4 g of a liquid polybutene known by a trade-mark "Nisseki Polybutene LV-10" and 0.125 g of a nonionic surface active agent known by a trade-mark "Electrostripper-PC" were mixed. To the mixture was added 25 g of bis-morpholine disulfide known by a trade-mark "Sanfel R" which had been separately weighed out. Then 17 ml of water was further added. Further mixing was carried out by stirring to obtain a homogeneous mixture. Following this, a spherically granulating process was carried out in the same manner as in Example 1 to obtain 27 g of a granular matter measuring 3.5 mm in average grain size. This granular matter contained 81% of bis-morpholine disulfide. The hardness of it was 260 g.

EXAMPLE 10

Twenty g of 2% sodium alginate, 4 g of a liquid polybutene known by a trademark "Nisseki Polybutene LV-10" and 0.125 g of a nonionic surface active agent known by a trademark "Emulgene 705" were mixed. To the mixture thus obtained was added 25 g of mercapto-benz-imidazole. Then 30 ml of water was also added. A stirring and mixing operation was further carried out to obtain a homogeneous mixture. A spherically granulating process was carried out in the same manner as in Example 1 to obtain 28 g of a granular matter measuring 3.0 mm in average grain size. The mercapto-benz-imidazole content of the granular matter was 80% while the hardness thereof was 273 g.

With granular organic rubber chemical compositions obtained in accordance with Examples 1 through 10, 5 parts of each of them was blended in 100 parts of natural rubber (RSS No. 1). The dispersed state of the granular organic rubber chemical composition in rubber was examined by carrying out roll milling. Using testing rolls ($6^B \times 12^B$, rotational ratio 1:1.23), the natural rubber RSS No. 1 was thinly passed. The passed rubber was equally divided to obtain quantity of rubber 100 g per batch. Each granular organic rubber chemical composition was added. After blending, a cut process was carried out and a thin passed sheet was obtained through closed rolls. Each thin passed sheet which measured about 0.2 mm in thickness was examined with the unaided eye to judge the dispersed state of the organic rubber chemicals by spreading the sheet out with hands.

The results of the examination were as shown in the table below. In each of the sheets, there was observed no matter that was inadequately dispersed. If was thus assertained that the granular organic rubber chemical compositions were homogeneously dispersed.

| Sample | Results of judgement on dispersed state |
| --- | --- |
| Granular composition of Example | |
| 1 | ◎ |
| 2 | ◎ |
| 3 | ◎ |
| 4 | ◎ |
| 5 | ◎ |
| 6 | ◎ |
| 7 | ◎ |
| 8 | ◎ |
| 9 | ◎ |
| 10 | ◎ |

◎ This mark indicates a homogeneously dispersed state with nothing inadequately dispersed within the rubber sheet.

Further, in cases where the liquid polybutene and the surface active agent were not added in each of the examples given in the foregoing, the dispersed state was not satisfactory, because there were observed some matters inadequately dispersed at a rate of 2 or 3 parts per square centimeter within the thin passed sheet.

What is claimed is:

1. A method for manufacturing a granular organic rubber chemical composition characterized in that an organic rubber chemical mixture consisting of an organic rubber chemical selected from the group consisting of a vulcanizing agent, a vulcanizing accelerator and an antioxidant and, relative to this organic rubber chemical, 5 to 45 wt % of a liquid polybutene which is of mean molecular weight of 200 to 10,000 and of viscosity not exceeding 37,000 centi-stokes at 100° F., 0.1 to 20 wt % of a nonionic or an ionic surface active agent and 0.1 to 2 wt % of a water-soluble anionic macromolecule which contains a carboxyl group or a hydroxyl group within the molecule thereof is hardened by bringing the mixture into contact with an aqueous solution containing an alkaline earth metal salt and/or a zinc salt.

2. A method for manufacturing a granular organic rubber chemical composition according to claim 1, wherein said organic rubber chemical mixture is hardened and granulated by dropping the mixture into said aqueous solution containing the alkaline earth metal salt or the zinc salt.

3. A method for manufacturing a granular organic rubber chemical composition according to claim 1, wherein said organic rubber chemical mixture is granulated prior to hardening the mixture by bringing it into contact with the aqueous solution containing the alkaline earth metal salt or the zinc salt.

4. A method for manufacturing a granular organic rubber chemical composition characterized in that an organic rubber chemical mixture consisting of an organic rubber chemical selected from the group consisting of a vulcanizing agent, a vulcanizing accelerator and an antioxidant and, relative to this organic rubber chemical, 5 to 45 wt % of a liquid polybutene which is of mean molecular weight of 200 to 10,000 and of viscosity not exceeding 37,000 centi-stokes at 100° F., 0.1 to 20 wt % of a nonionic or anionic surface active agent, 0.1 to 8 wt % of a water-soluble anionic macro-molecule which contains a carboxyl group or a hydroxyl group within the molecule thereof and 30 wt % or less than that of process oil, an ethylene-vinyl acetate copolymer, paraffin wax or a plasticizer is hardened by bringing the mixture into contact with an aqueous solution containing an alkaline earth metal salt or a zinc salt.

5. A method for manufacturing a granular organic rubber chemical composition according to claim 4, wherein said organic rubber chemical mixture is hardened and granulated by dropping the mixture into said aqueous solution containing the alkaline earth metal salt or the zinc salt.

6. A method for manufacturing a granular organic rubber chemical composition according to claim 4, wherein said organic rubber chemical mixture is granulated prior to hardening the mixture by bringing it into contact with the aqueous solution containing the alkaline earth metal salt or the zinc salt.

* * * * *